W. CACKO.
FAUCET.
APPLICATION FILED APR. 12, 1913.

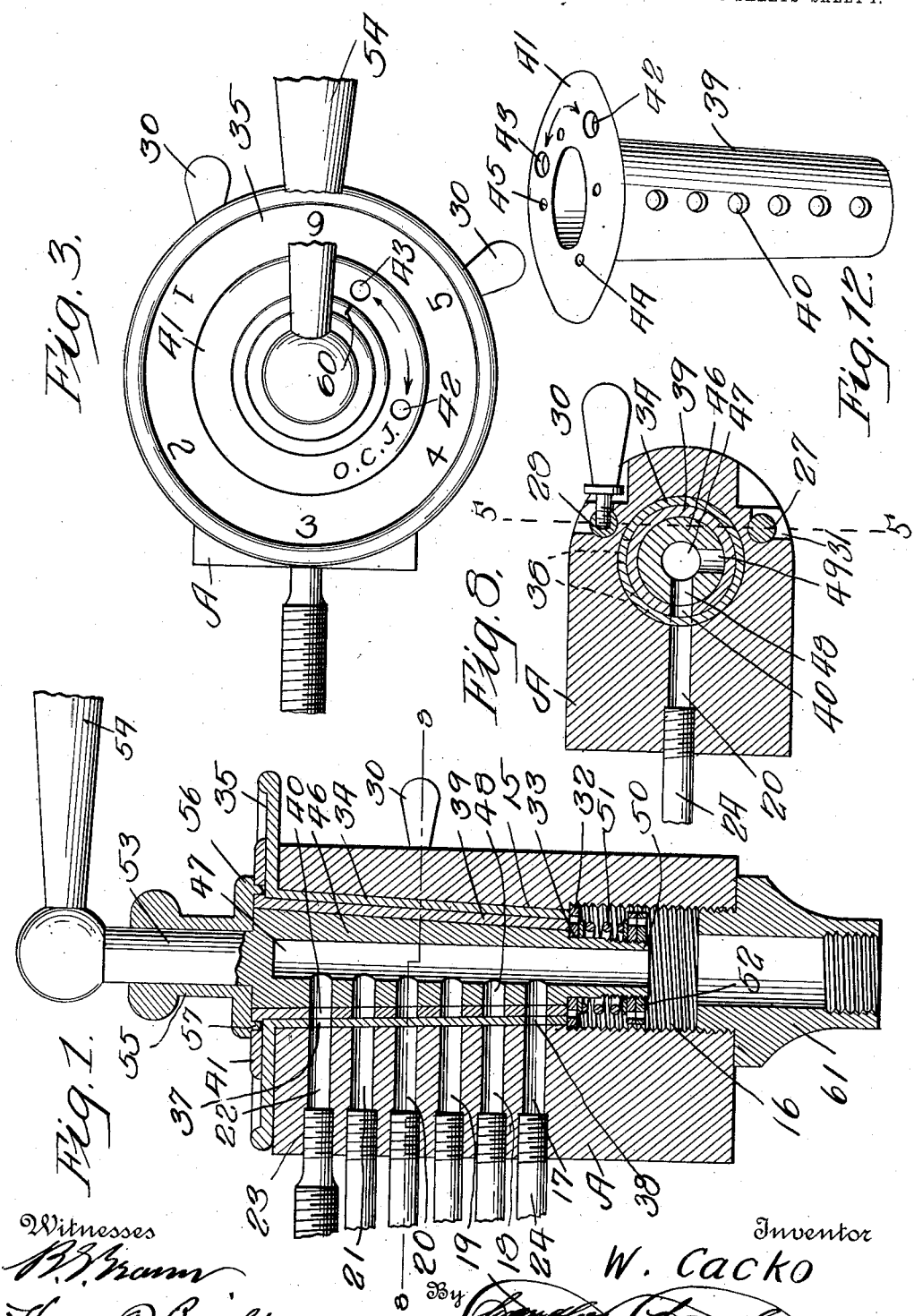

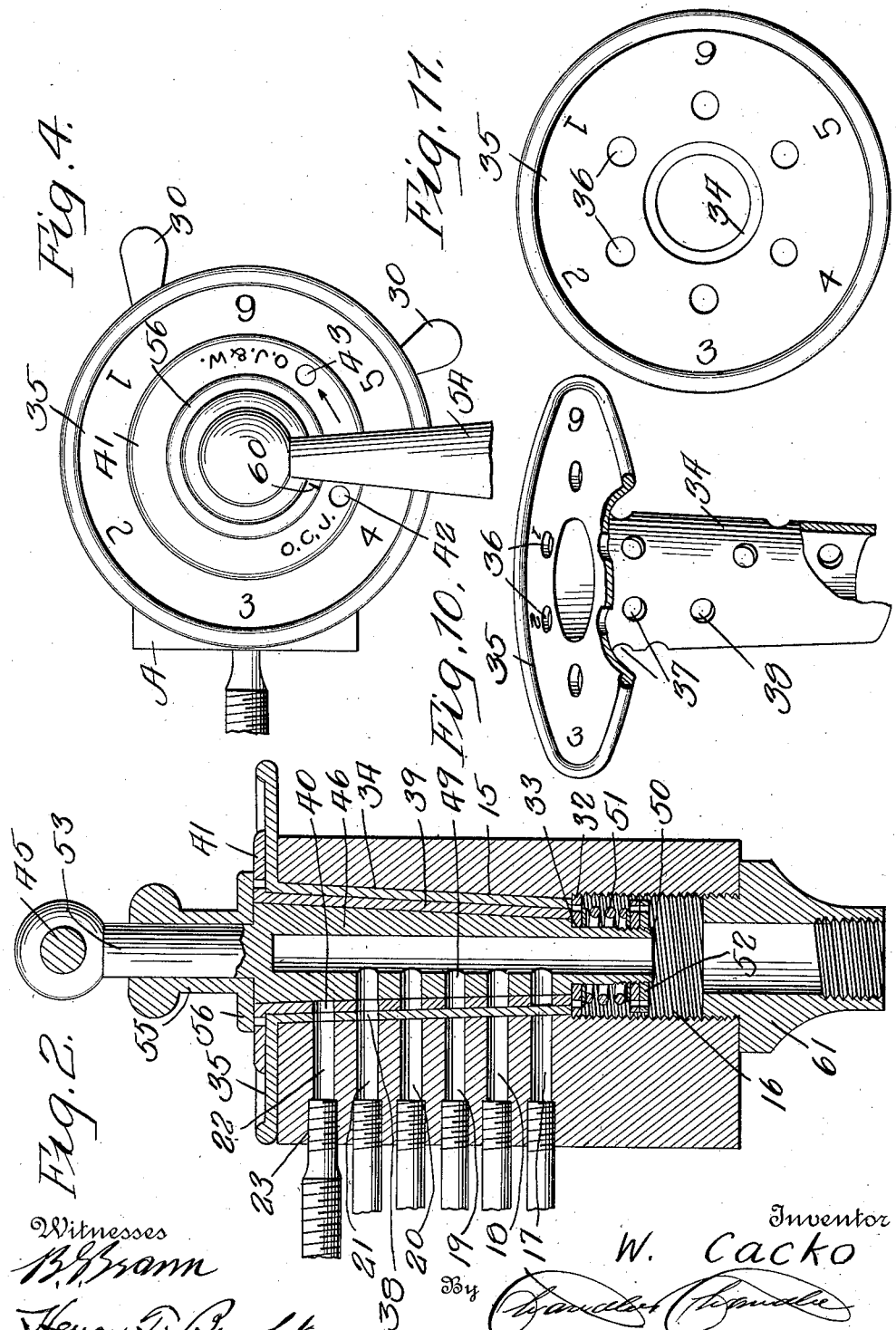

1,078,252.

Patented Nov. 11, 1913.

3 SHEETS—SHEET 3.

Witnesses
B. E. Bram
Henry O. Bright

Inventor
W. Cacko
By Chandler & Chandler
Attorneys

UNITED STATES PATENT OFFICE.

WALTER CACKO, OF ELIZABETH, NEW JERSEY.

FAUCET.

1,078,252.  Specification of Letters Patent.  Patented Nov. 11, 1913.

Application filed April 12, 1913. Serial No. 760,698.

*To all whom it may concern:*

Be it known that I, WALTER CACKO, a citizen of the United States, residing at Elizabeth, in the county of Union, State of New Jersey, have invented certain new and useful Improvements in Faucets; and I do hereby declare the following to be a full, clear, and exact description of the invention, such as will enable others skilled in the art to which it appertains to make and use the same.

This invention relates to faucets.

The object of the invention resides in the provision of a faucet which will enable liquids to be drawn from independent supplies and mixed together before delivery from the faucet.

A further object of the invention resides in the provision of a faucet through which liquid from independent sources may be drawn selectively.

A still further object of the invention resides in the provision of a faucet by means of which fluid from a given source may be directed selectively through a plurality of pipes or may be directed through one of said pipes and simultaneously through any one of the remainder of said pipes.

Another object of the invention resides in the provision of a faucet of the character referred to which will be simple in construction, easily assembled and taken apart, easily set to accomplish a desired result, and efficient in use.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 5:
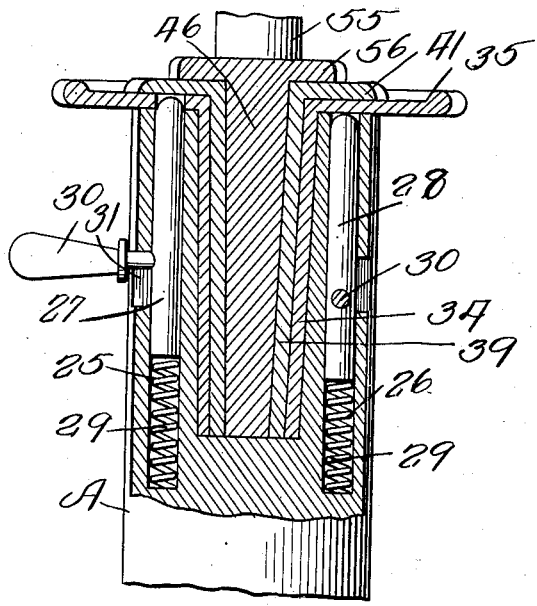
Figure 6:
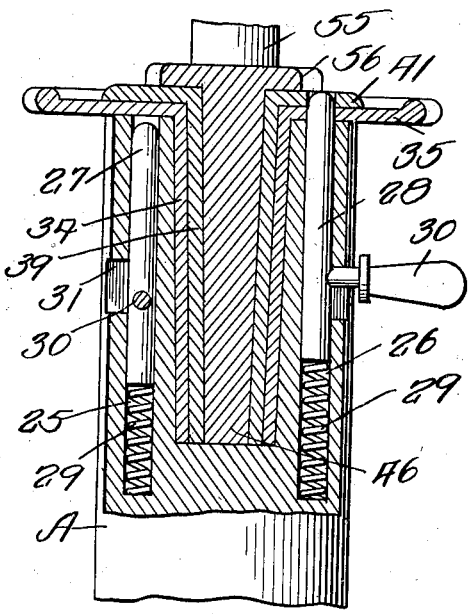
Figure 7:
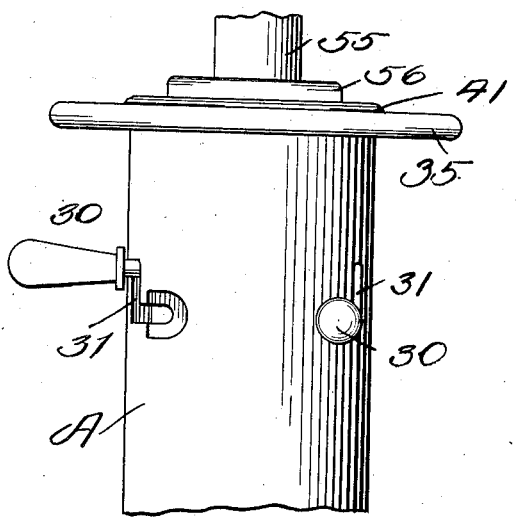
Figure 9:
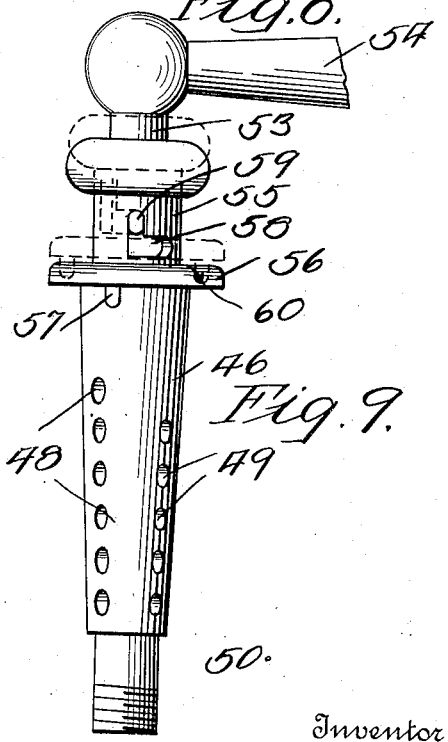

Figure 1 is a vertical section through a faucet constructed in accordance with the invention and with the parts in position to effect the delivery of liquids from two independent sources in a mixed form; Fig. 2, a view similar to Fig. 1 with the parts in position to effect delivery of liquid from a single source; Fig. 3, a plan view of what is shown in Fig. 1; Fig. 4, a plan view of what is shown in Fig. 2; Fig. 5, a section on the line 5—5 of Fig. 8; Fig. 6, a view similar to Fig. 5 showing the position of the parts just after setting the valve to effect a single delivery of liquid instead of a double delivery; Fig. 7, a partial elevation looking at the right hand side of Fig. 1; Fig. 8, a section on the line 8—8 of Fig. 1; Fig. 9, a view in elevation of the inner valve plug of the faucet together with the parts carried thereby; Fig. 10, a detail perspective view of the selective setting member; Fig. 11, a plan view of the selective setting member; and Fig. 12, a detail perspective view of the shutter member which controls the ports in the valve plug which is disposed between said plug and the selective setting member.

Referring to the drawings the faucet is shown as comprising a body A having a passage 15 therethrough, the upper portion of said passage tapering inwardly, while the lower portion is cylindrical and has its wall threaded as at 16. Formed in the body portion A is a vertical series of transverse passages 17, 18, 19, 20, 21 and 22 the inner ends of which communicate with the tapered portion of the passage 15 while the outer ends of said passages are threaded as at 23 and engaged in the threaded ends of these passages are pipes 24 respectively each of which leads from a separate liquid supply (not shown). Also formed in the body A are recesses 25 and 26 which open through the upper end of said body and have slidably mounted therein respectively, locking bolts 27 and 28 which are constantly forced upwardly by means of springs 29 interposed between the inner ends of said bolts and the inner ends of respective recesses 25 and 26. Secured to each locking bolt 27 and 28 is a handle 30 which works in an L-shaped slot 31 formed in the body A, the horizontal arm of each slot 31 being disposed inwardly so that when the bolts 27 and 28 are retracted the handle 30 may be moved into the horizontal arm of each slot 31 and thereby lock the bolt in retracted position. Adjustably engaged within the threaded end 16 of the passage 15 is a threaded disk 32 provided with a central passage 33 for a purpose that will presently appear. Disposed in the tapered portion of the passage 15 and having its lower end resting against the disk 32 is a tapered tubular stem 34 which constitutes the selective setting member of the faucet. The upper end of the stem 34 is provided with a flange 35 which overlies the upper end of the body A and has indicated thereon numerals corresponding in number to the pipes 24 and the passages with which said pipes are connected. As six such pipes and passages are shown in this instance the numerals indicated on the flange 35 will run from one to six inclusive. The flange 35 is also provided with a plurality of openings 36 which are adapted to interchangeably receive bolt 27 to secure the stem 34 against rotation from a given set position. The stem 34 is provided with a plurality of openings or ports 37 corresponding in number to the number of pipes 24 and disposed in a common horizontal plane with the passage 22. The stem 34 is further provided with a plurality of openings or ports 38 of a number one less than the pipes 24 and disposed successively in a downward direction and in the horizontal planes occupied by the passages 21, 20, 19, 18 and 17 respectively.

Disposed within the stem 34 is a tapered tubular stem 39 which constitutes the shutter member of the faucet and is adapted to close one series of openings in the valve plug to be later referred to. Formed in the stem 39 is a vertical series of ports 40 corresponding in number to the number of pipes 24 and adapted to register simultaneously with respective passages 22, 21, 20, 19, 18 and 17 respectively. Formed on the upper end of the stem 39 is a flange 41 which partially overlies the flange 35. Formed in the flange 41 are setting openings 42 and 43 and also locking openings arranged in opposed pairs 44 and 45 all for a purpose that will presently appear. Disposed within the stem 39 is a tapered plug 46 provided with a longitudinal recess 47 opening through its lower end. This plug 46 is also provided with a vertical series of ports 48 communicating with the recess 47 and corresponding in number to the ports 40 in the stem 39 and are disposed in the same horizontal planes as the ports 40 respectively. The plug 46 is further provided with a vertical series of ports 49 of a number one less than the ports 48 and disposed respectively in the same horizontal planes as the passages 21, 20, 19, 18 and 17. The lower end of the plug is reduced and threaded as at 50. This reduced end extends through the opening 33 in the disk 32. Encircling the end 50 of the plug is a spring 51 one end of which bears against the disk 32 while the other end bears against a nut 52 engaged on the end 50. The upper end of the plug 46 terminates in a stem 53 and this stem carries at its outer end an operating handle 54. Loosely mounted upon the stem 53 is a sleeve 55 the inner end of which is provided with a flange 56 which partially overlies the flange 41 and is provided on its inner face with diametrically opposite studs 57 which are adapted to interchangeably seat in the openings 44 and 45 of the flange 41 to lock the stem 39 to the plug 46 for simultaneous rotation with said plug when the latter is operated by the handle 54. The sleeve 55 is provided with an L-shaped slot 58 in which is engaged a pin 59 carried by the stem 53, said pin serving to limit both the longitudinal movement and axial rotation of the sleeve 55 on the stem 53 as will be obvious. Formed on the outer side of the flange 56 is a marking 60 in the form of an arrow and which when the faucet is set to draw liquids through the passage 22 alone or through the passage 22 and any one of the remaining passages 21, 20, 19, 18 and 17 in the same operation the arrow 60 is set to point to the opening 43. On the other hand if it is desired to draw liquid selectively through any of the passages 21, 20, 19, 18 and 17 the arrow 60 is set to point to the opening 42.

If it is desired to draw liquids simultaneously through the passages 22 and 17 as shown in Fig. 1 the bolt 27 is retracted and the stem 34 rotated to dispose the numeral six at the front of the faucet and in the plane of the passages 22, 21, 20, 19, 18 and 17. The bolt 27 is then released to the influence of the spring 29 which latter will force the bolt into one of the openings 36 and lock the stem 34 against rotation in the body portion A. The bolt 28 is then released to the influence of its spring so as to pass through one of the remaining openings 36 and bear against the inner side of the flange 41. The handle 54 is then operated to rotate the stem 39 to the left until the opening 43 alines with the bolt 28 when said bolt will pass into the opening and lock the stem 39 against further rotation. The sleeve 55 is then moved longitudinally on the stem 53 to disengage the studs 57 from the openings 44 and thus permit rotation of the plug 46 independent of the rotation of the stem 39. With the sleeve 55 in this position the plug 46 is rotated together with the sleeve 55 until the arrow 60 points to the opening 43 when the sleeve 55 is again moved longitudinally to engage the studs 57 in the openings 45 and thus again lock the plug 46 and the stem 39 together. The bolt 28 is then locked in retracted position and the handle 54 moved so as to point forwardly of the faucet and lie in the same plane with the pipes 24. With the handle in this position passage 22 one of the ports 37, uppermost port 40 and the uppermost port 48 will register so that liquid from the uppermost pipe 24 can flow into the recess 47 of the plug 46. At the same time the passage 17, lowermost port 40 and lowermost port 48 will register so that liquid from the lowermost pipe 24 can flow into the recess 47 and there mix with the liquid delivered from the uppermost pipe 24. The resulting mixture of liquid will be discharged through a suitable nozzle 61 mounted in the passage 15 by means of the threads 16. If it is desired to deliver a mixture of liquid from the pipes 24 connected with passages 18 and 22 respectively it is only necessary to retract the bolt 27 and rotate the stem 34 until the numeral five occupies the position previously occupied by the numeral six. The bolt 27 is then released to the influence of the spring and the handle 54 operated to the plane of the pipes 24 when the desired result will be accomplished. If it is desired to draw liquid only through the passage 22 the stem 34 is adjusted until the numeral one occupies the position previously occupied by the numeral five and the handle operated to open the faucet heretofore referred to.

If it is desired to draw liquid through any of the passages 17, 18, 19, 20 and 21 selectively the stem 39 is rotated and locked through the medium of the bolt 28 and the studs 57 disengaged from the openings 45. The plug 46 and sleeve 55 are then rotated until the arrow 60 points to the opening 42 when the studs 57 are engaged in the openings 44 to lock the plug 46 and stem 39 together. The bolt 28 is then retracted and the stem 34 rotated to dispose the numeral two forwardly of the faucet. The bolt 27 is then released to lock the stem 34 against rotation from its set position. The handle 54 is then moved to the position shown in Fig. 2 and in this state of the faucet, the passage 21, one of the openings or ports 38, one of the ports 40, and one of the ports 49 will all register. If it is desired to draw liquid through the passage 20 the stem 34 is set with the numeral three forwardly of the faucet and the handle 54 again operated to open the faucet. The remaining passages 19, 18, and 17 may be selectively brought into communication with the recess 40 by precisely the same operation.

What I claim is:—

A faucet of the class described comprising a body having a longitudinal passage therethrough and a plurality of transverse passages communicating at one end with the longitudinal passage and adapted for connection at their other ends respectively with separate liquid supplies, a valve plug rotatably mounted in said passage and provided with a longitudinal recess and a plurality of ports communicating with the recess and adapted for simultaneous registration with the transverse passages of the body respectively, and a tubular member rotatably mounted in the passage of the body between the latter and the plug, said member being provided with a plurality of ports adapted during the rotation of the member to simultaneously establish communication between a given transverse passage of the body and certain of the other transverse passages of said body with corresponding ports of the plug.

In testimony whereof, I affix my signature, in the presence of two witnesses.

WALTER CACKO.

Witnesses:
RICHARD A. BARRY,
MILLICENT BARRY.

Copies of this patent may be obtained for five cents each, by addressing the "Commissioner of Patents, Washington, D. C."